(12) United States Patent
Fulton

(10) Patent No.: US 10,262,051 B2
(45) Date of Patent: Apr. 16, 2019

(54) ADJUSTABLE GRAPHICAL DISPLAY SYSTEM

(71) Applicant: ADP, LLC, Roseland, NJ (US)

(72) Inventor: Keith Wilson Fulton, South Orange, NJ (US)

(73) Assignee: ADP, LLC, Roseland, NJ (US)

( * ) Notice: Subject to any disclaimer, the term of this patent is extended or adjusted under 35 U.S.C. 154(b) by 858 days.

(21) Appl. No.: 14/615,923

(22) Filed: Feb. 6, 2015

(65) Prior Publication Data

US 2016/0232217 A1 Aug. 11, 2016

(51) Int. Cl.
G06F 17/30 (2006.01)
G06F 3/0482 (2013.01)
G06F 3/0484 (2013.01)
G06Q 10/10 (2012.01)

(52) U.S. Cl.
CPC ...... *G06F 17/30572* (2013.01); *G06F 3/0482* (2013.01); *G06F 3/0484* (2013.01); *G06F 17/30551* (2013.01); *G06F 17/30554* (2013.01); *G06Q 10/10* (2013.01)

(58) Field of Classification Search
CPC ......... G06F 17/30572; G06F 17/30551; G06F 17/30554; G06F 3/0482; G06F 3/0484; G06Q 10/10
See application file for complete search history.

(56) References Cited

U.S. PATENT DOCUMENTS

| 6,014,661 A * | 1/2000 | Ahlberg | G06F 17/30572 |
| 6,049,776 A * | 4/2000 | Donnelly | G06Q 10/063112 700/100 |
| 6,486,896 B1 * | 11/2002 | Ubillos | G06F 3/04847 715/781 |
| 7,688,322 B2 * | 3/2010 | Kapler | G06Q 10/06 345/419 |
| 7,966,297 B2 * | 6/2011 | Guilbert | G06F 17/3056 707/662 |
| 2011/0107259 A1 * | 5/2011 | Haugh | G06F 3/0482 715/810 |
| 2012/0191704 A1 * | 7/2012 | Jones | G06F 17/30572 707/722 |
| 2013/0326582 A1 | 12/2013 | Kruzeniski et al. | |
| 2014/0278539 A1 * | 9/2014 | Edwards | G06Q 50/24 705/3 |

(Continued)

FOREIGN PATENT DOCUMENTS

WO 2011044017 A1 4/2011

*Primary Examiner* — Robert W Beausoliel, Jr.
*Assistant Examiner* — Susan F Rayyan
(74) *Attorney, Agent, or Firm* — Yee & Associates, P.C.

(57) ABSTRACT

A method and apparatus for displaying organization information on a display system. A computer system identifies a position of a control displayed in a graphical user interface displayed on the display system. The computer system also identifies the organization information for a time period located in a database that corresponds to the position of the control in the graphical user interface. Further, the computer system displays the organization information identified in the database in the graphical user interface on the display system, wherein a graphical display of the organization information in the graphical user interface in the display system enables presenting the organization information for selected time periods.

21 Claims, 12 Drawing Sheets

(56) References Cited

U.S. PATENT DOCUMENTS

| | | | | |
|---|---|---|---|---|
| 2014/0281993 A1* | 9/2014 | Hyde | ................ | H04N 21/2541 |
| | | | | 715/719 |
| 2015/0169736 A1* | 6/2015 | MacPherson | ....... | G06F 3/04842 |
| | | | | 715/739 |
| 2015/0213631 A1* | 7/2015 | Vander Broek | ....... | G06T 11/206 |
| | | | | 345/589 |
| 2015/0301698 A1* | 10/2015 | Roques | ................ | G06F 3/0482 |
| | | | | 715/736 |

\* cited by examiner

ADJUSTABLE GRAPHICAL DISPLAY SYSTEM

BACKGROUND INFORMATION

1. Field

The present disclosure relates generally to computer systems and, in particular, to selectively displaying information on a display system. The present disclosure relates to a method and apparatus for displaying organization information on a display system based on the manipulation of a control in a graphical user interface.

2. Background

Organization information systems are used for many different purposes. For example, an organization information system may take the form of the payroll system used to process payroll to generate paychecks for employees in an organization. Additionally, an organization information system also may be used by a human resources department to maintain benefits and other records about employees. For example, a human resources department may manage health insurance, wellness plans, and other programs and organizations using an organization information system.

An organization information system includes a database of records. These records contain information about objects in the organization. These records may be searched and viewed to perform actions within an organization. However, these types of records in currently used databases are cumbersome and difficult to read when it involves historical records or futuristic records. As a result, errors may occur in reading the records and more time than desired may be needed to obtain information from a database and an organization information system.

Therefore, it would be desirable to have a method and apparatus that take into account at least some of the issues discussed above, as well as other possible issues. For example, it would be desirable to have a method and apparatus that overcome the issues associated with comprehending historical or futuristic information in records for objects in the organization in a database.

SUMMARY

In one illustrative embodiment, a method for displaying organization information on a display system is presented. A computer system identifies a position of a control displayed in a graphical user interface displayed on the display system. The computer system also identifies the organization information for a time period located in a database that corresponds to the position of the control in the graphical user interface. Further, the computer system displays the organization information identified in the database in the graphical user interface on the display system, wherein a graphical display of the organization information in the graphical user interface in the display system enables presenting the organization information for selected time periods.

In another illustrative embodiment, a computer system comprises a display system and a viewer in the computer system in communication with the display system. The viewer identifies a position of a control displayed in a graphical user interface displayed on the display system. The viewer also identifies organization information for a time period located in a database that corresponds to the position of the control in the graphical user interface. Further, the viewer displays the organization information identified in the database in the graphical user interface on the display system. A graphical display of the organization information in the graphical user interface in the display system enables presenting the organization information for selected time periods.

In yet another illustrative embodiment, a computer program product for displaying organization information on a display system comprises a computer readable storage media, first program code, second program code, and third program code stored on the computer readable storage media. The first program code identifies a position of a control displayed in a graphical user interface displayed on the display system. The second program code identifies the organization information for a time period located in a database that corresponds to the position of the control in the graphical user interface. The third program code displays the organization information identified in the database in the graphical user interface on the display system. A graphical display of the organization information in the graphical user interface in the display system enables presenting the organization information for selected time periods.

In still another illustrative embodiment, a computer system comprises a display system and a viewer in the computer system in communication with the display system. The viewer identifies a position of a control displayed in a graphical user interface displayed on the display system. The viewer also identifies employee information for a time period located in a database that corresponds to the position of the control in the graphical user interface. Further, the viewer displays the employee information identified in the database in the graphical user interface on the display system. A graphical display of the employee information in the graphical user interface in the display system enables presenting the employee information for selected time periods.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that currently, when updates are made to records for an object in the organization, old information is overwritten with new information. The illustrative embodiments recognize and take into account that the older information is often not retained.

For example, when the object is an employee, marital status may change over time. With the change of marital status, the name of the employee also may change. As another example, an employee may move from time to time. As a result, address changes are entered into the database.

If a prior address is needed, the illustrative embodiments recognize and take into account that finding that prior address is currently a difficult process. Looking for a prior address for an employee may require searching other records in the database, paper records, backups of databases, or other sources. This process is time-consuming and tedious. Additionally, this information in these forms may be more difficult to analyze and review than desired.

The illustrative embodiments recognize and take into account that historical data may be saved to allow research into prior information for an employee that may no longer be current. Additionally, the illustrative embodiments recognize and take into account that changes that occur at a future point in time also may be saved in a database for an employee. For example, a pay raise that is to occur at a future point in time may be saved in the employee information system.

The illustrative embodiments provide a method and apparatus that overcome the technical issue of comprehending historical or futuristic information in records for objects in a database. For example, the illustrative embodiments provide a method and apparatus for displaying organization information on a display system. In one illustrative example, a computer system identifies a position of a control in a graphical user interface displayed on a display system. The computer system identifies organization information for a time period located in a database that corresponds to the position of the control in the graphical user interface. The computer system retrieves the organization information located in the database and displays the organization information retrieved from the database in the graphical user interface on the display system. The display of the organization information in the graphical user interface on the display system enables presenting organization information for selected time periods.

Figure 1:
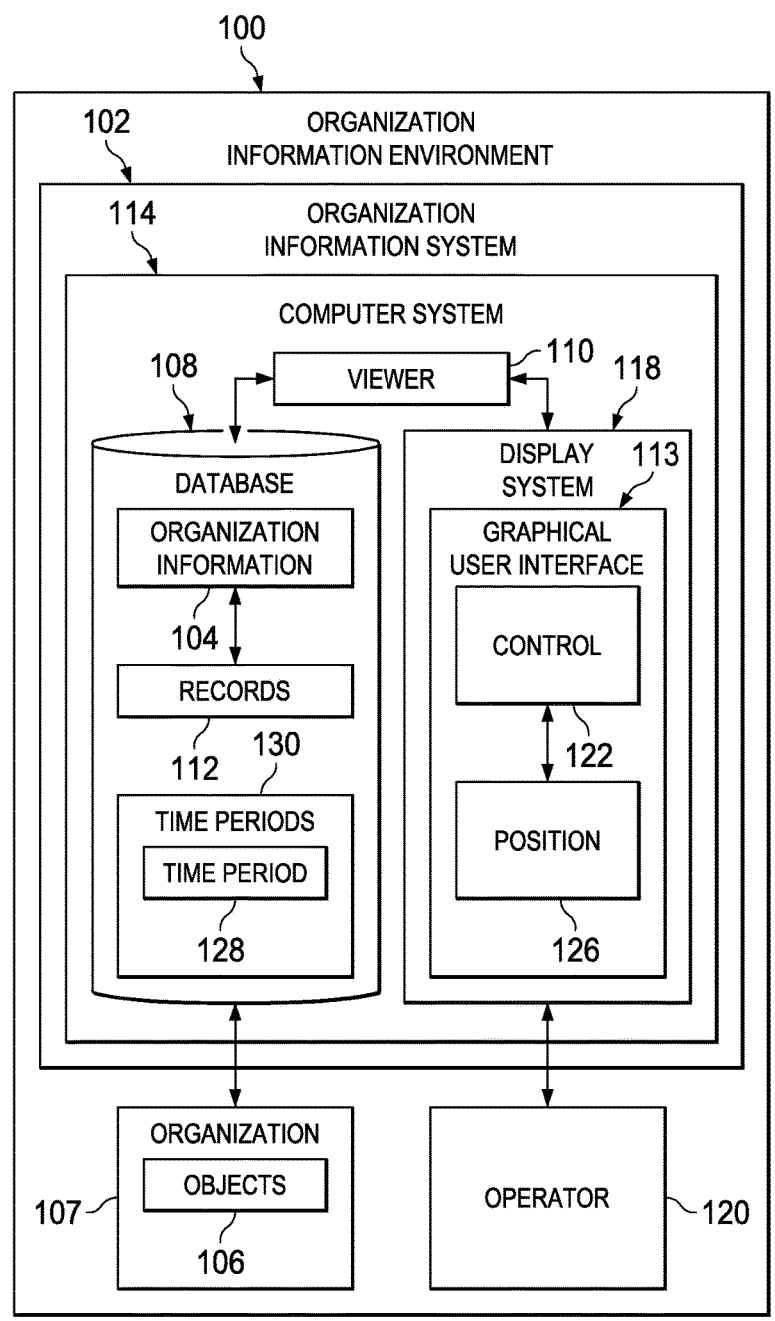
FIG. 1 is an illustration of a block diagram of an organization information environment in accordance with an illustrative embodiment.

With reference now to figures, and in particular, with reference to FIG. 1, an illustration of a block diagram of an organization information environment is depicted in accordance with an illustrative embodiment. In this illustrative example, organization information environment 100 contains organization information system 102. Organization information system 102 is used to access organization information 104 about objects 106 in organization 107. Organization information 104 may be any information about an employee or person within or outside of organization 107. This information may include employee information, employee benefits, skills, performance evaluation, dependent information, human resource related information, research data, a plan, a design, marketing data, business information, financial information, or other information relating to organization 107.

As depicted, objects 106 may be selected from at least one of an employee, a vendor, a supplier, a customer, a product, a building lease, an equipment lease, a contract, an event, a business transaction, a project, a business plan, a department, a research project, a marketing campaign, a performance evaluation, an employee benefits package, or other type of grouping of information for organization 107 that may change over time. For example, when the object is an employee, organization information 104 may be employee information selected from at least one of a name, an award, a home address, an age, a marital status, an education level, experience, a job title, a job description, compensation, benefits, tenure, or other suitable information.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Organization 107 may take various forms. For example, organization 107 may be a company, a charity, a government entity, or some other suitable organization. The access may include, for example, at least one of adding, deleting, changing, or otherwise manipulating organization information 104.

In this illustrative example, organization information system 102 includes a number of components. As depicted, organization information system 102 includes database 108 and viewer 110.

Database 108 is an organized collection of information. In this illustrative example, database 108 stores organization information 104. As depicted, organization information 104 may be stored in data structures, such as records 112 in database 108.

As depicted, viewer 110 is a component that accesses database 108 and displays organization information 104 in graphical user interface 113. Viewer 110 may be implemented in software, hardware, firmware, or a combination thereof. When software is used, the operations performed by viewer 110 may be implemented in program code configured to run on hardware, such as a processor unit. When firmware is used, the operations performed by viewer 110 may be implemented in program code and data and stored in persistent memory to run on a processor unit. When hardware is employed, the hardware may include circuits that operate to perform the operations in viewer 110.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, viewer 110 may be implemented in computer system 114. Computer system 114 is a hardware system and includes one or more data processing systems. When more than one data processing system is present, those data processing systems may be in communication with each other using a communications medium. The communications medium may be a network. The data processing systems may be selected from at least one of a computer, a server computer, a tablet, a mobile phone, or some other suitable data processing system.

As depicted, viewer 110 in computer system 114 displays organization information 104 in graphical user interface 113 on display system 118 in computer system 114. Display system 118 is a hardware system and includes one or more display devices.

In this illustrative example, graphical user interface 113 provides an interface for operator 120 to interact with database 108. Operator 120 may be any user that desires to access organization information 104.

As depicted, viewer 110 displays control 122 in graphical user interface 113. Control 122 is a graphical element that may be manipulated by operator 120. In this illustrative example, control 122 controls the display of organization information 104.

As depicted, viewer 110 in computer system 114 identifies position 126 of control 122 in graphical user interface 113 displayed on display system 118. Viewer 110 identifies organization information 104 for time period 128 in time periods 130 located in database 108 that corresponds to position 126 of control 122 in graphical user interface 113.

A time period is a group of points in time in the illustrative examples. As used herein, "a group of," when used with reference to items, means one or more items. For example, a group of points in time is one or more points in time. When more than one point in time is present, the points in time may be a range of points in time that are sequential to each other. In one illustrative example, a point in time may represent a date. In another illustrative example, a point in time may represent a particular hour, month, or year.

Viewer 110 retrieves organization information 104 located in database 108. In particular, organization information 104 that is retrieved is organization information 104 that corresponds to time period 128. Viewer 110 displays organization information 104 retrieved from database 108 in graphical user interface 113 on display system 118. The display of organization information 104 in graphical user interface 113 on display system 118 enables presenting organization information 104 for selected time periods 130.

As depicted, computer system 114 operates as a special purpose computer system in which viewer 110 in computer system 114 enables viewing organization information 104 for time periods 130 including time period 128. This viewing of organization information 104 on computer system 114 is much more than a mere display of data on a computer. In the illustrative example, viewer 110 transforms computer system 114 into a special purpose computer system as compared to currently available general computer systems that do not have viewer 110. In this depicted example, graphical user interface 113 is displayed on a display device by computer system 114 on display system 118 using viewer 110 in a manner that allows at least one of easier comprehension of organization information 104 or quicker viewing of organization information 104 than is currently possible with existing computer systems.

Figure 2:
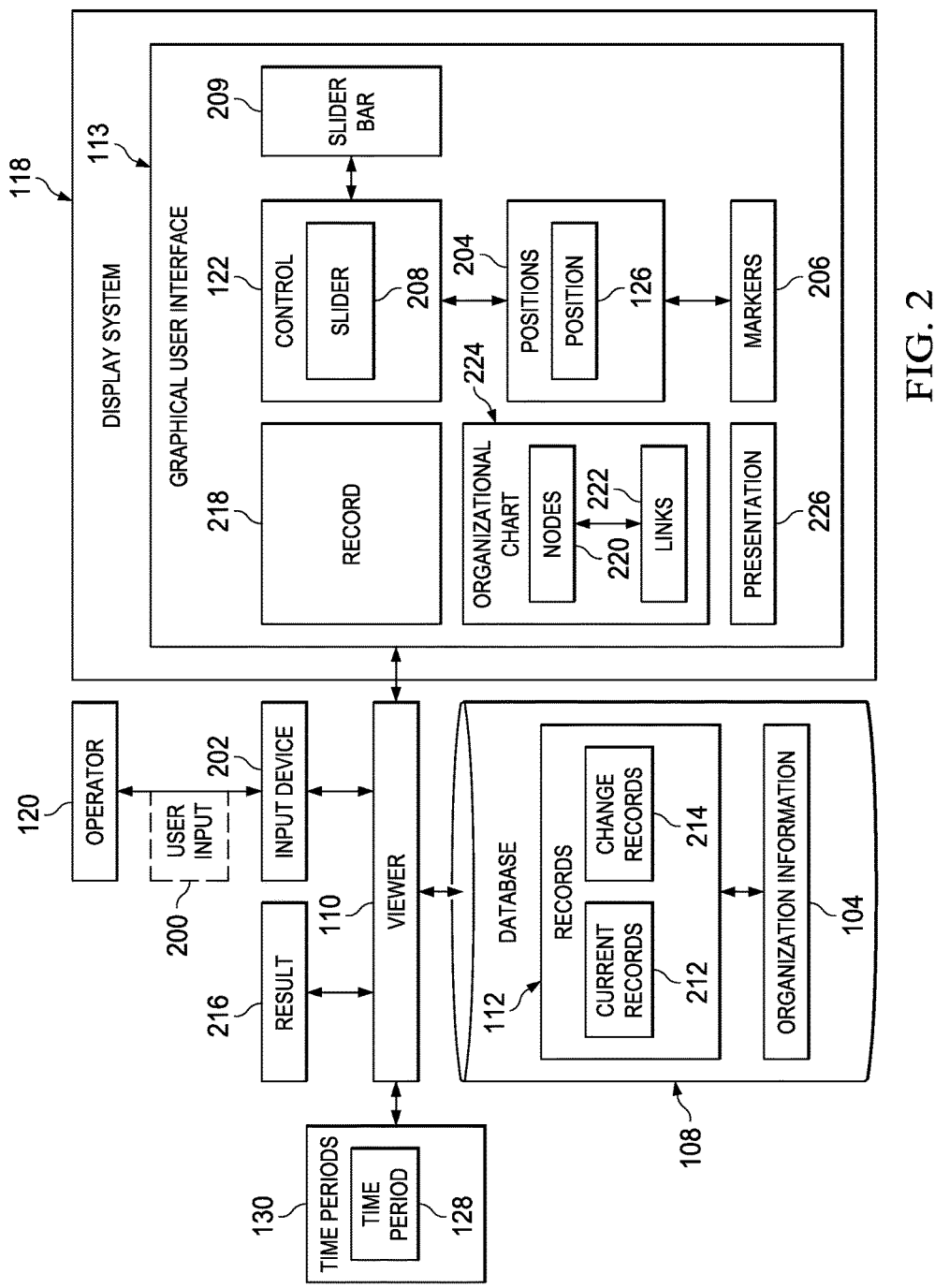
FIG. 2 is an illustration of a block diagram showing data flow performed to generate a graphical user interface for displaying organization information in accordance with an illustrative embodiment.

With reference now to FIG. 2, an illustration of a block diagram showing data flow performed to generate a graphical user interface for displaying organization information is depicted in accordance with an illustrative embodiment. In the illustrative examples, the same reference numeral may be used in more than one figure. This reuse of the reference numeral in different figures represents the same element being present in the different figures.

As depicted, user input 200 is received by viewer 110 from operator 120 through input device 202. Input device 202 may take various forms. For example, input device 202 may be selected from one of a mouse, a trackball, a keyboard, a touch screen, or some other suitable type of input device.

In this illustrative example, control 122 may be moved to different positions in positions 204 in response to user input 200. Positions 204 correspond to time periods 130 in FIG. 1. As depicted, each position in positions 204 corresponds to time period 128 in time periods 130. For example, position 126 of control 122 corresponds to time period 128.

Positions 204 may be graphically indicated in this illustrative example. For example, markers 206 may be displaying in association with control 122. In the illustrative example, markers 206 correspond to time periods 130 for which organization information 104 may be displayed in graphical user interface 113.

In one illustrative example, control 122 is slider 208. Slider 208 may move relative to a graphical element. In this illustrative example, the graphical element is slider bar 209. Slider bar 209 may be straight, curved, circular, or have some other shape.

When user input 200 is received, viewer 110 identifies position 126 from user input 200. As depicted, user input 200 is received from input device 202 and may change position 126 of control 122 in graphical user interface 113 on display system 118.

Viewer 110 identifies time period 128 for position 126 from time periods 130 based on positions 204 of control 122. In the illustrative example, time periods 130 may be based on events. The events may be periodic or non-periodic. For example, periodic events may be periods of time that are monthly, yearly, weekly, or some other period of time. In another illustrative example, non-periodic events may be marital status changes, organization changes, address changes, or some other suitable event.

With the identification of time period 128, viewer 110 identifies organization information 104 located in database 108 that corresponds to position 126 of control 122 in graphical user interface 113 as changed by user input 200. For example, viewer 110 may query database 108 for organization information 104 that corresponds to time period 128.

In this illustrative example, organization information 104 in database 108 is organized using records 210. A record is a data structure. In particular, a record may be a set of fields that are related to an entity. For example, a record may be a set of fields related to an object such as an employee. For example, the fields in the record may be fixed such that each field has a name and may be of a different type from other fields in the record.

Records 210 in database 108 may be organized as rows in a table in one illustrative example. In another illustrative example, records 210 may be organized using linked lists.

As depicted, records 210 include current records 212 and change records 214. Current records contain organization information 104 that is current for objects 106 in FIG. 1.

Change records 214 contain organization information 104 to indicate that a change in organization information 104 has occurred. For example, change records 214 store historical information about objects 106 in FIG. 1. For example, changes in address, marital status, compensation, job title, and other changes may be stored in change records 214. In this manner, changes to organization information 104 may be stored and retrieved as compared to currently used organization information systems.

As depicted, the query for organization information 104 based on position 126 of control 122 searches records 210. This search may include at least one of current records 212 or change records 214.

In this illustrative example, viewer 110 displays organization information 104 identified in database 108 as result 216 and may be displayed in graphical user interface 113 on display system 118. Result 216 may be displayed in a number of different ways. For example, viewer 110 may display result 216 in the form of record 218 in records 210. Record 218 may be an employee record when the object in objects 106 is an employee. In another illustrative example, viewer 110 may display result 216 by graphically displaying organization information 104 identified in database 108 using nodes 220 in graphical user interface 113 on the display system 118. Viewer 110 also may graphically display links 222 between nodes 220 to graphically indicate the relationships between nodes 220 that are graphically displayed in graphical user interface 113 on display system 118. For example, nodes 220 and links 222 may be used to display organization information 104 as organizational chart 224.

In yet another illustrative example, result 216 may be presented by viewer 110 as presentation 226. Presentation 226 may be generated by viewer 110 from the identifications of positions 204 of control 122 selected by user input 200. In other words, user input 200 may move control 122 to different positions in positions 204. Viewer 110 then generates presentation 226 from organization information 104 identified for each of positions 204 to form displays of organization information 104. These displays may be used to form slides, videos, images, or other suitable formats for presentation 226 of organization information 104. Viewer 110 displays presentation 226 of organization information 104 on display system 118.

In this illustrative example, graphical user interface 113 is graphically displayed on a display device by computer system 114 on display system 118 using viewer 110 in a manner that allows operator 120 to more quickly view organization information 104 than is currently possible with existing user input 200 received from operator 120 through input device 202.

Figure 3:
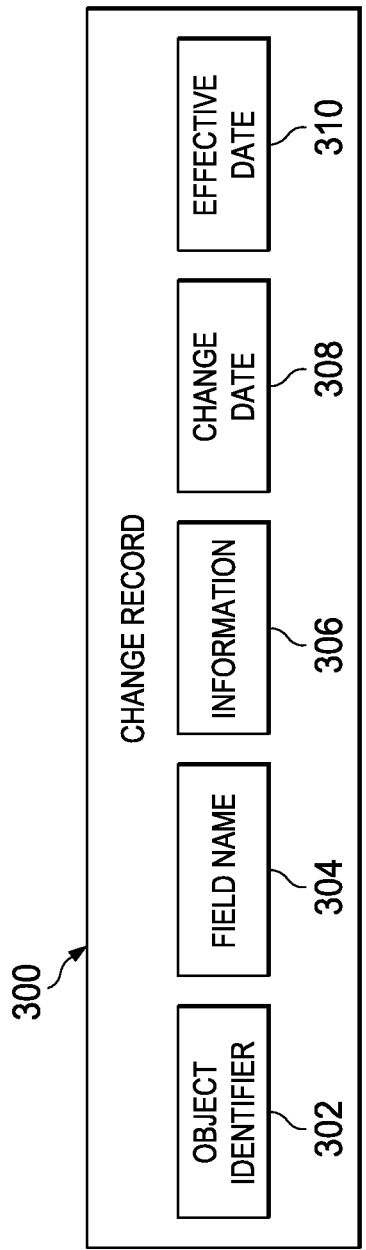
FIG. 3 is an illustration of a block diagram of a change record in accordance with an illustrative embodiment.

With reference now to FIG. 3, an illustration of a block diagram of a change record is depicted in accordance with an illustrative embodiment. In this illustrative example, change record 300 is an example of a change record that may be used to implement change records 214 in FIG. 2.

As depicted, change record 300 includes a number of different fields. In this illustrative example, change record 300 includes object identifier 302, field name 304, information 306, change date 308, and effective date 310.

Object identifier 302 identifies the object for which the change information is entered. Object identifier 302 may take various forms. For example, object identifier 302 may be a serial number, a Social Security number, a part number, a contract number, a department number, or some other suitable type of identifier.

Field name 304 identifies the fields in which the change is entered. Field name 304 may be, for example, a name, an address, compensation, a title, a job description, marital status, or another suitable type of field when the object is an employee.

In the illustrative example, information 306 is information that is changed for the object, such as an employee. For example, if a name of an employee changes from Smith to Jones, Jones is information entered into information 306.

Change date 308 indicates when the change was entered into change record 300. As depicted, effective date 310 indicates when information 306 is to be used for the employee. Effective date 310 may be different from change date 308. Effective date 310 may be prior to, the same as, or after change date 308.

For example, information 306 about a change in marital status may be entered into database 108 in FIG. 2 on Sep. 1, 2013. The effective date may be Jul. 1, 2014. This effective date indicates that information 306 about the change in marital status was entered after the change occurred.

In another illustrative example, a compensation change may be entered on Jul. 1, 2014. That date is change date 308. The compensation change may be effective on Dec. 12, 2014. This date is effective date 310. In still another example, change date 308 may be for the start of an equipment lease, a project, an event, or for some other object in the organization in addition or in place of to an employee.

The illustration of organization information environment 100 and different components in this environment in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although control 122 is described as being slider 208, control 122 may take other forms in different illustrative examples. Control 122 may be selected from one of a scrollbar, a dial, a trackball, or some other suitable type of control.

As another example, presentation 226 may be sent to an output device such as a printer. In this manner, presentation 226 may be placed into a hard copy form.

As another example, change record 300 shows fields for one change in organization information. Each change to information for an object may be stored as a separate record. In other illustrative examples, change record 300 may include additional sets of fields similar to the ones illustrated in FIG. 3 for each change to the information for an object.

Figure 4:
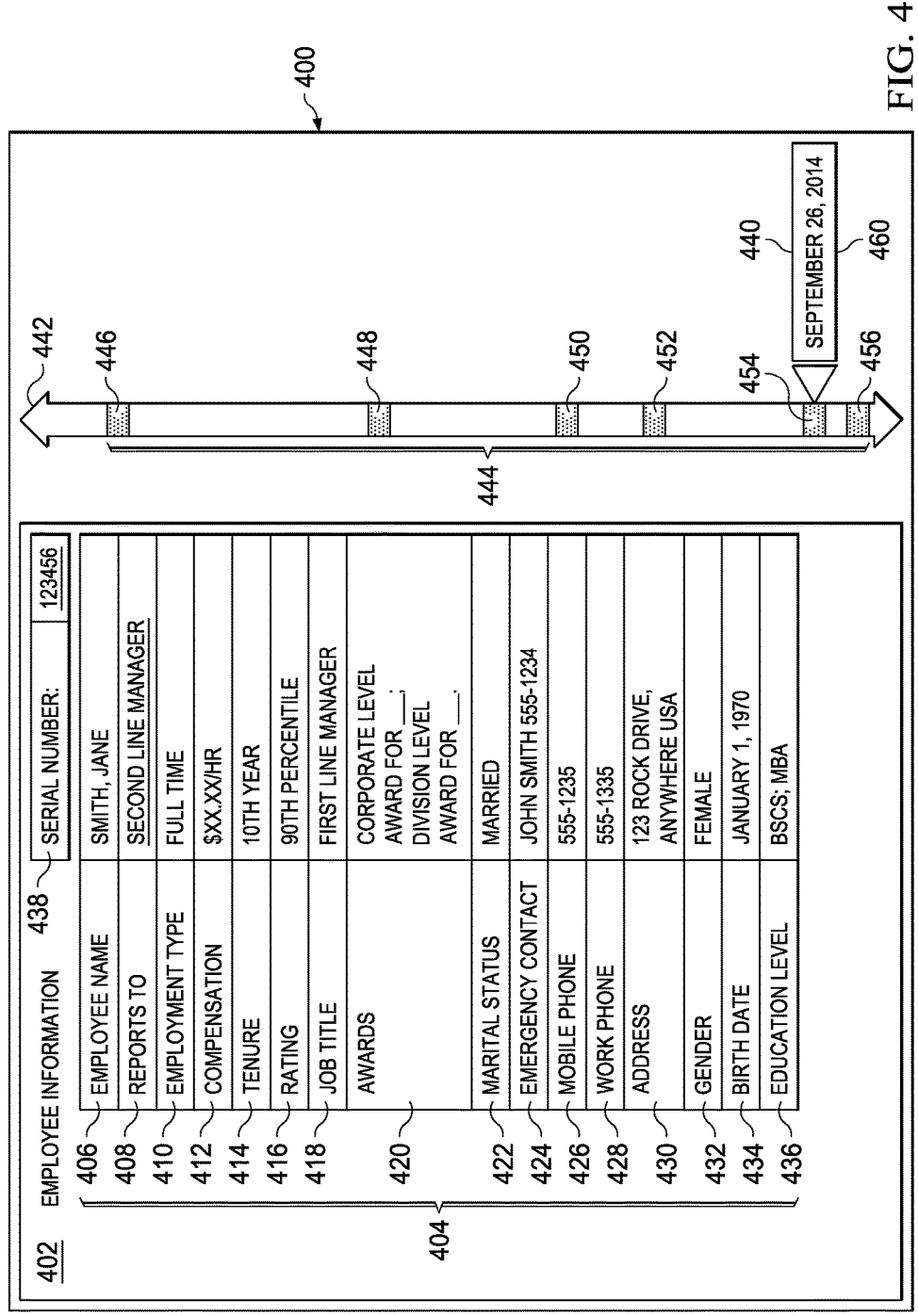
FIG. 4 is an illustration of a graphical user interface displaying organization information in accordance with an illustrative embodiment.

Turning next to FIG. 4, an illustration of a graphical user interface displaying organization information is depicted in accordance with an illustrative embodiment. In this illustrative example, graphical user interface 400 is an example of an implementation for graphical user interface 113 shown in block form in FIG. 1 and FIG. 2.

In this illustrative example, the object in the organization is an employee. Graphical user interface 400 displays employee record 402. Employee record 402 is an example of a record in records 112 in FIG. 1. As depicted, employee record 402 is a visualization of a portion of organization information 104 in FIG. 1.

As depicted, employee record 402 includes fields 404 for information about an employee. In this illustrative example, fields 404 are displayed with current information about an employee. As depicted, fields 404 include employee name 406, reports to 408, employment type 410, compensation 412, tenure 414, rating 416, job title 418, awards 420, marital status 422, emergency contact 424, mobile phone 426, work phone 428, address 430, gender 432, birthdate 434, education level 436, and serial number 438.

Graphical user interface 400 also displays slider 440. Slider 440 is an example of an implementation for control 122 shown in block form in FIG. 1 and slider 208 shown in block form in FIG. 2.

In this illustrative example, slider 440 may be moved along slider bar 442 in graphical user interface 400. Markers 444 are displayed on slider bar 442. As depicted, markers 444 include marker 446, marker 448, marker 450, marker 452, marker 454, and marker 456. Slider bar 442 is an example of an implementation of slider bar 209 shown in block form in FIG. 2. Markers 444 are examples of an implementation for markers 206 shown in block form in FIG. 2.

As depicted, slider bar 442 represents a timeline and markers 444 represent events for different dates. The movement of slider 440 to different positions on slider bar 442 changes the display of employee information in employee record 402 in graphical user interface 400.

In this example, slider bar 442 is located in a position at marker 454 in graphical user interface 400. Marker 454 represents a current date in this illustrative example. Marker 446, marker 448, marker 450, and marker 452 represent events for prior dates in time for the current state. These prior dates are prior points in time in this illustrative example. Marker 446 represents the hire of the employee. Marker 448 represents a marriage for the employee. Marker 450 represents an award. Marker 452 represents a promotion. Marker 454 represents a current date.

As depicted, marker 456 represents an event that has not yet occurred but will occur at a future point in time. In this example, marker 456 represents a compensation change planned for the employee at a future date.

In particular, markers 444 show changes that occurred to the employee information for the employee and employee record 402. These changes may be viewed by moving slider 440 to the different markers in markers 444 on slider bar 442.

In this illustrative example, slider 440 is positioned by marker 454. Marker 454 represents the current date. As depicted, the information shown in employee record 402 is the current information for the employee with the position of slider 440 at marker 454.

In the illustrative example, date 460 is displayed in slider 440. Date 460 represents the date of when information changed for the employee at a particular marker in markers 444. As slider 440 moves to different markers in markers 444, date 460 changes to represent the date for the particular marker at which slider 440 is located. The movement of slider 440 to different markers in markers 444 changes information in one or more of fields 404 displayed for employee record 402 in graphical user interface 400.

Figure 5:
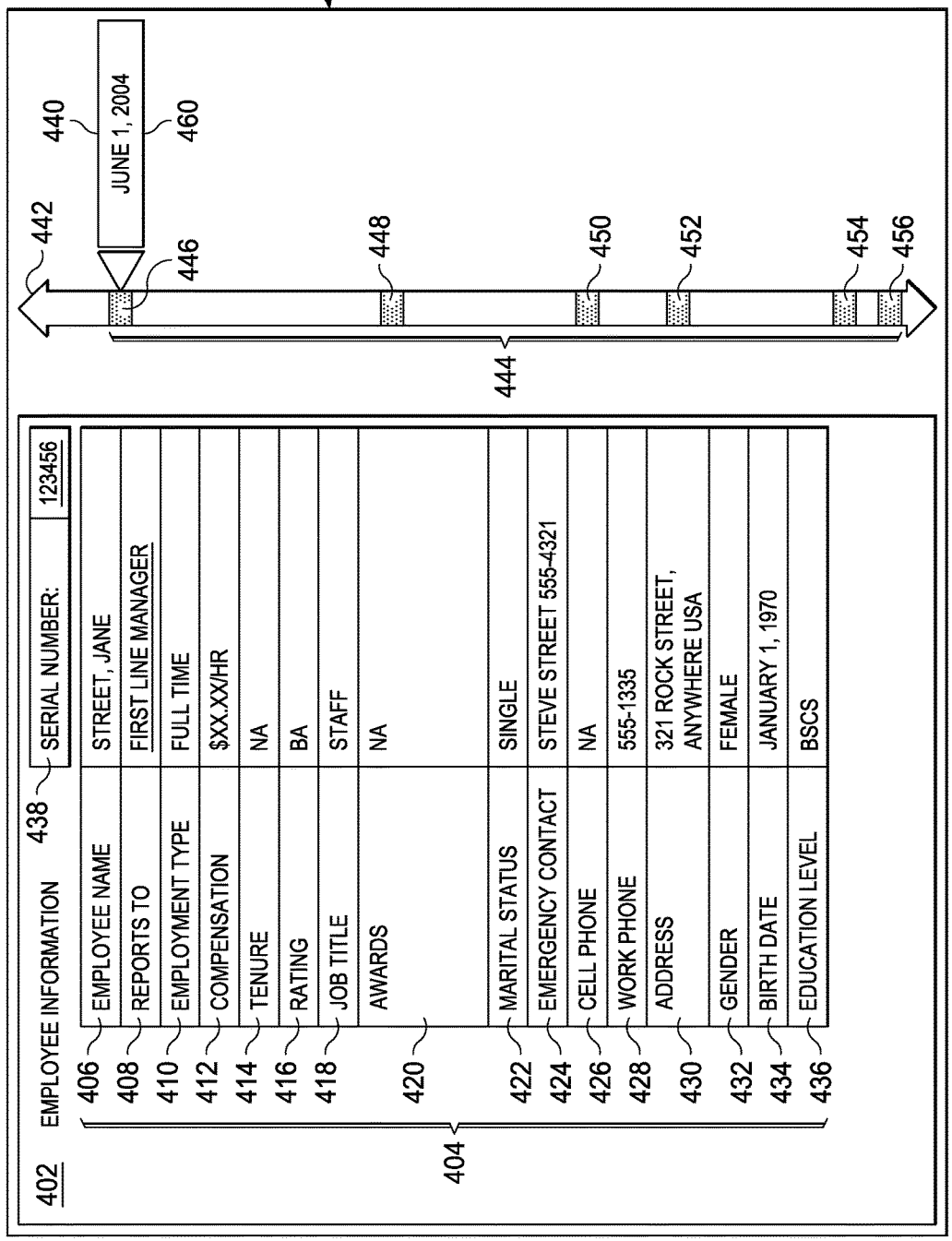
FIG. 5 is an illustration of a graphical user interface displaying organization information in accordance with an illustrative embodiment.

Turning next to FIG. 5, an illustration of a graphical user interface displaying organization information is depicted in accordance with an illustrative embodiment. In this illustrative example, slider 440 has been moved to marker 446. Marker 446 represents a hire date in the timeline on slider bar 442.

The employee information displayed in employee record 402 has changed to reflect the information for the employee at the hire date. In this example, date 460 displays Jun. 1, 2004 for the hire date for marker 446.

Figure 6:
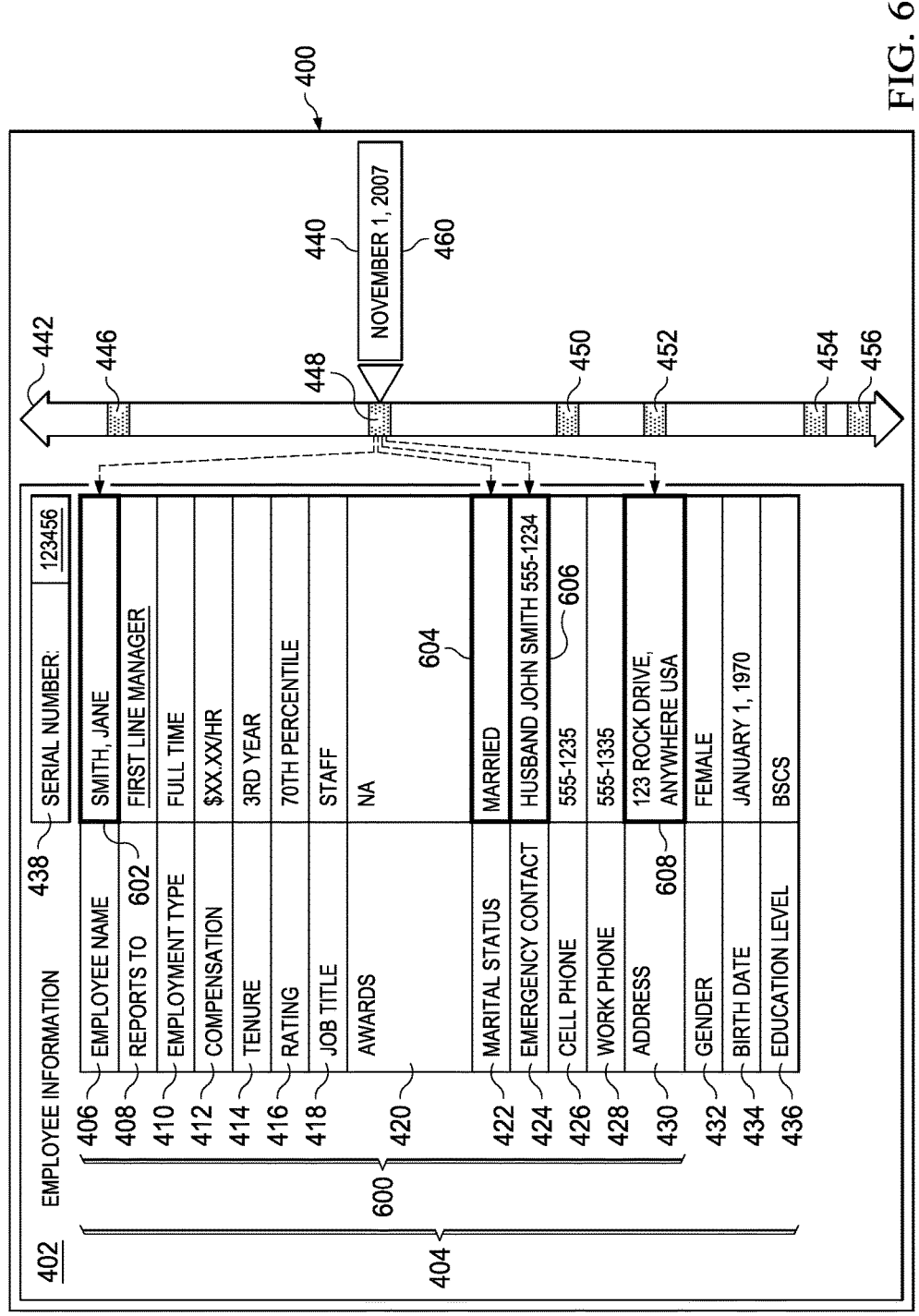
FIG. 6 is an illustration of a graphical user interface displaying organization information in accordance with an illustrative embodiment.

Turning next to FIG. 6, an illustration of a graphical user interface displaying organization information is depicted in accordance with an illustrative embodiment. In this illustrative example, slider 440 has been moved to marker 448, which represents a marriage event for the employee in this example.

As shown in this illustrative example, employee record 402 is displayed to reflect employee information for the employee at the time for marker 448. As can be seen, date 460 in slider 440 reflects the date of this event.

Employee name 406, marital status 422, emergency contact 424, and address 430 in fields 404 reflects the change made on that date in the database. In this illustrative example, graphical indicators 600 indicate the change made on that date in employee record 402. As depicted, graphical indicators 600 include graphical indicator 602, graphical indicator 604, graphical indicator 606, and graphical indicator 608.

Graphical indicators 600 may take various forms. For example, graphical indicator 600 may be selected from at least one of highlighted text, bolded text, italicized text, underlined text, font size, font type, color, animation, icons, or other suitable types of graphical indicators.

Figure 7:
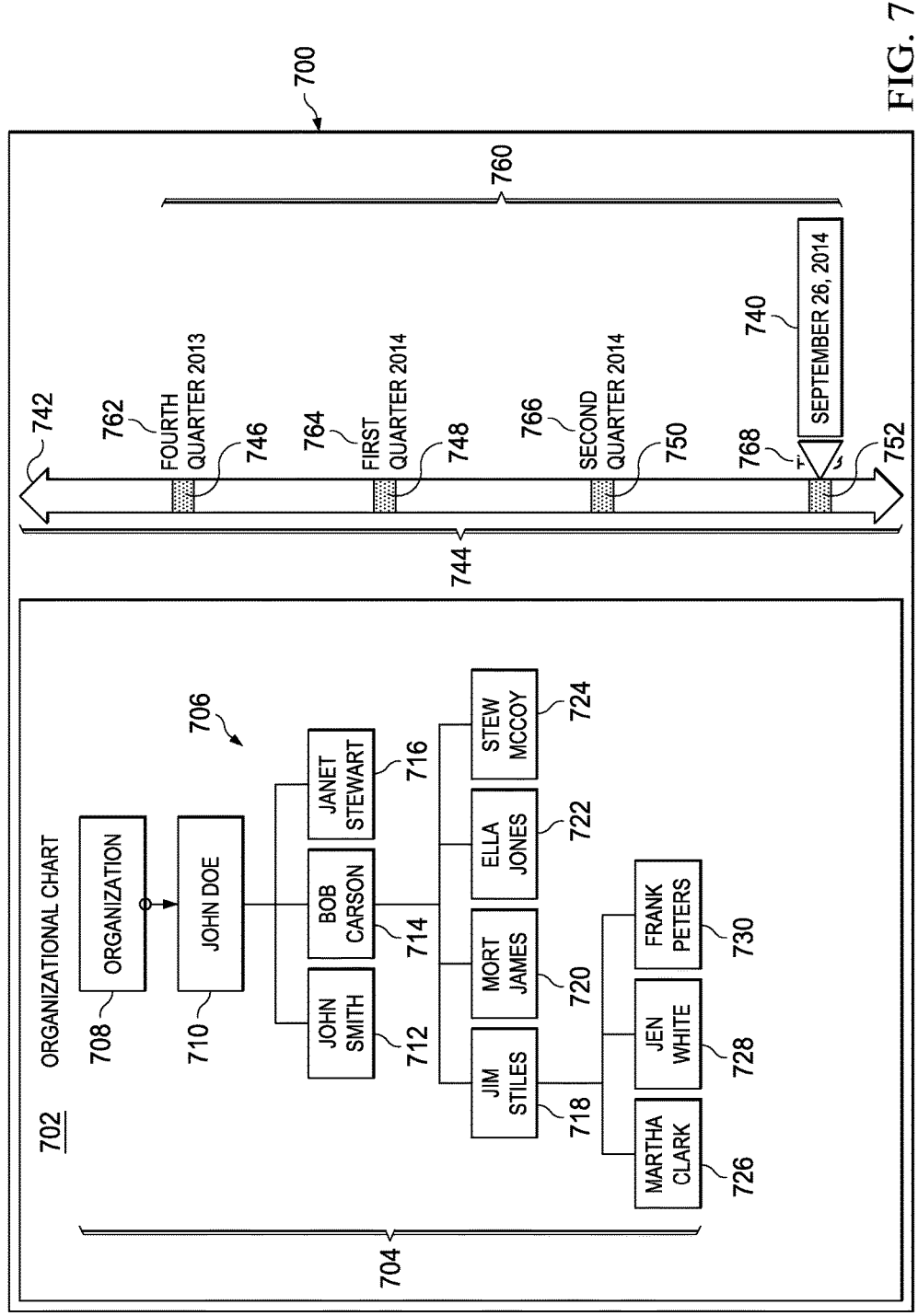
FIG. 7 is an illustration of a graphical user interface displaying organization information in accordance with an illustrative embodiment.

Turning next to FIG. 7, an illustration of a graphical user interface displaying organization information is depicted in accordance with an illustrative embodiment. In this illustrative example, graphical user interface 700 is an example of an implementation for graphical user interface 113 shown in block form in FIG. 1.

In this illustrative example, organizational chart 702 is displayed in graphical user interface 700. Organizational chart 702 is generated from employee information, such as name, title, and other suitable information that may be found in employee information.

In this illustrative example, organizational chart 702 includes nodes 704 and links 706. Nodes 704 represent employees in organizational chart 702. Links 706 represent the relationships between the nodes.

As depicted, nodes 704 include node 708, node 710, node 712, node 714, node 716, node 718, node 720, node 722, node 724, node 726, node 728, and node 730. Node 708 represents the organization while node 710, node 712, node 714, node 716, node 718, node 720, node 722, node 724, node 726, node 728, and node 730 represent employees.

Also displayed in graphical user interface 700 is slider 740. Slider 740 is an example of an implementation for control 122 shown in block form in FIG. 1 and slider 208 shown in block form in FIG. 2. Slider bar 742 is shown in graphical user interface 700. Slider bar 742 is an example of an implementation for slider bar 209 shown in block form in FIG. 2. Slider bar 742 represents a timeline for changes in organizational chart 702. Slider 740 may be moved along slider bar 742.

In these illustrative examples, markers 744 are displayed on slider bar 742. As depicted, markers 744 include marker 746, marker 748, marker 750, and marker 752.

In this illustrative example, markers 744 represent events where changes to organizational chart 702 have occurred. For example, changes in employees represented in nodes 704 may be seen when slider 740 is moved to different markers in markers 744. These events may be periodic. For example, organizational chart 702 may be updated on a quarterly basis. With quarterly updates, markers 744 represent quarterly dates of when updates to organizational chart 702 may occur.

In this example, slider 740 is positioned at marker 752. Marker 752 represents the last update to organizational chart 702.

In this illustrative example, labels 760 are displayed in association with markers 744. As depicted, labels 760 include label 762, label 764, label 766, and label 768. The movement of slider 740 to another marker in markers 744 results in displaying organizational chart 702 at that time.

Figure 8:
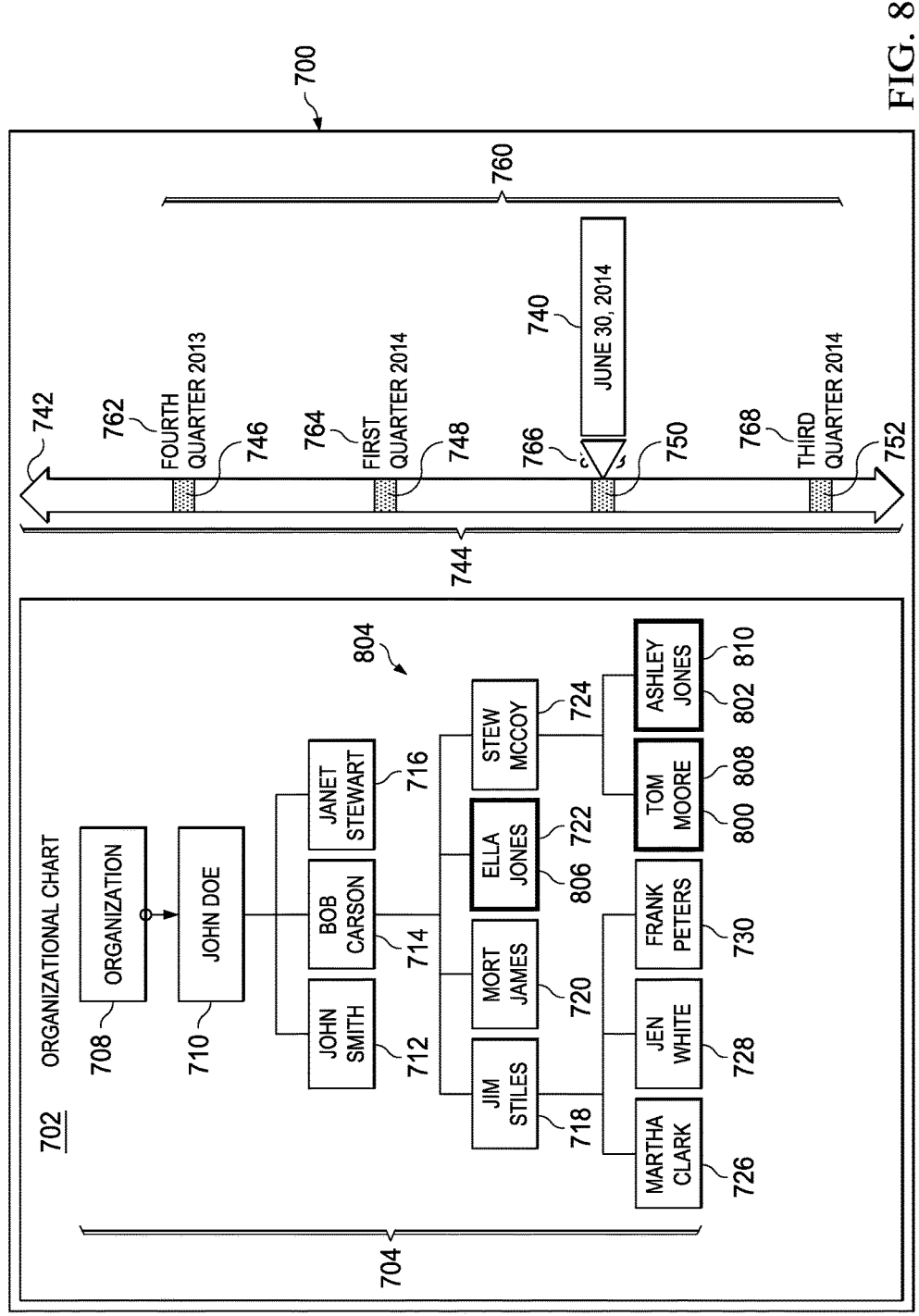
FIG. 8 is an illustration of a graphical user interface displaying organization information in accordance with an illustrative embodiment.

Turning next to FIG. 8, an illustration of a graphical user interface displaying organization information is depicted in accordance with an illustrative embodiment. In this illustrative example, slider 740 has been moved to a position at marker 750. The display of organizational chart 702 in graphical user interface 700 is changed from the display of organizational chart 702 shown in FIG. 7.

In this figure, nodes 704 also include node 800 and node 802. These employees were present in organizational chart 702 at the prior date at marker 750. These employees are not present in the organization at the current time as shown in FIG. 7 when slider 740 is located at marker 752.

Additionally, graphical indicators 804 are displayed. Graphical indicators 804 include graphical indicator 806, graphical indicator 808, and graphical indicator 810. These graphical indicators draw the attention of someone viewing organizational chart 702 to the changes in organizational chart 702. In this manner, changes in organizational chart 702 for an organization may be seen by moving slider 740 to different markers in markers 744.

Figure 9:
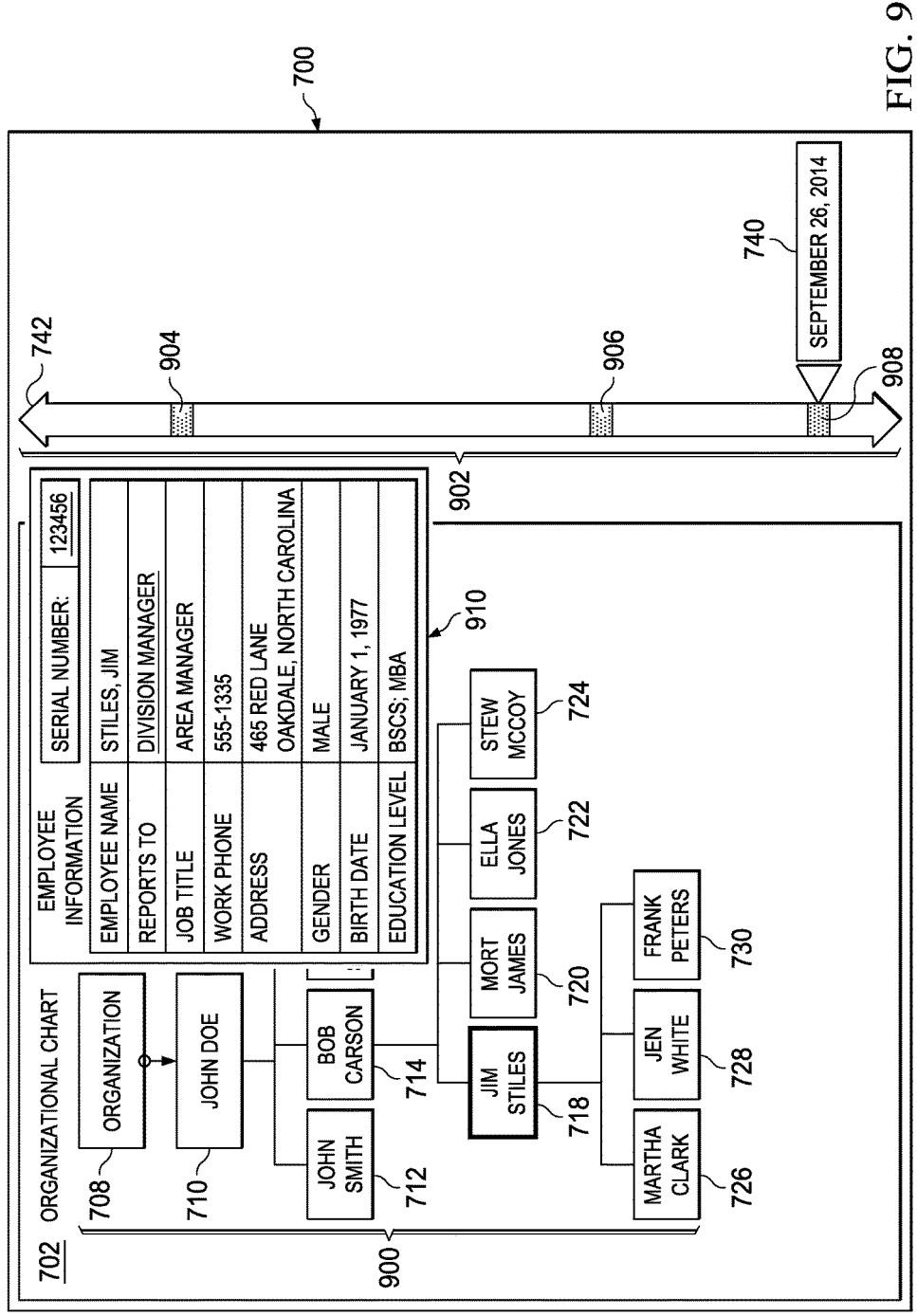
FIG. 9 is an illustration of a graphical user interface displaying organization information in accordance with an illustrative embodiment.

With reference next to FIG. 9, an illustration of a graphical user interface displaying organization information is depicted in accordance with an illustrative embodiment. In this example, node 718 in organizational chart 702 displaying graphical user interface 700 has been selected. The selection of node 718 results in graphical indicator 900 being displayed in association with node 718. Additionally, the selection of node 718 results in markers 902 being displayed on slider bar 742 in place of markers 744 in FIG. 7 and FIG. 8.

Markers 902 include marker 904, marker 906, and marker 908. These markers now represent events for the employee represented in node 718 in organizational chart 702. In particular, the focus of employee information is around the employee in node 718 rather than the organization as a whole with the selection of node 718 in this illustrative example.

Movement of slider 740 to different positions indicated by markers 902 changes the employee information displayed in employee record 910. The employee information displayed corresponds to the employee information present for the employee at the point in time as indicated by the position of slider 740.

The illustrations of the graphical user interfaces in FIGS. 4-9 are provided as illustrative examples of some implementations of graphical user interface 113 shown in block form in FIG. 1 and are not meant to limit the manner graphical user interface 113 may be implemented in other illustrative examples.

For example, although nodes 704 in organizational chart 702 are shown as rectangles, nodes 704 may be displayed using other types of graphical elements in other examples. For example, circles, triangles, or other shapes may be used to graphically display nodes 704. In yet another example, images of the employees may be displayed to represent the employees in nodes 704.

As another illustrative example, selecting a node in organizational chart 702 may result in a different type of focus on the employee in the node selected. For example, movement of slider 740 may result in the organizational chart changing and highlighting the location of the employees in the organizational chart. In this manner, changes in the responsibilities or reporting to information may be displayed relative to the employee selected in a node representing the employee. If the organizational chart is too large to display on a display device in the display system, the organizational chart may be displayed such that the selected node remains centered in the display system in another illustrative example.

Also, although a particular field and format has been shown for the employee records, other fields and formats may be used in addition to or in place of the ones in the depicted examples. For example, office location, department, and other suitable information may be used in addition to or in place of the fields shown in employee record 402 in FIGS. 4-6 and employee record 910 in FIG. 9.

In still another illustrative example, the graphical user interface may display a presentation. The presentation may be a video, slides, or some other suitable type of presentation that shows employee information over different points in time. This presentation and the other types of displays of organization information shown in the graphical user interfaces in FIGS. 4-9 are generated using viewer 110 in these illustrative examples. In this manner, computer system 114 with viewer 110 is a special purpose computer system that enables presenting organization information for selected periods of time more easily and quickly than with currently available computer systems.

In still another illustrative example, the display of organization information may be for other types of objects. In addition to employees, for example, graphical user interface 400 in FIGS. 4-6 may display organization information for objects such as a department, a vendor, a customer, a client, a project, a lease, a business plan, a marketing project, or other suitable types of objects for the organization.

Figure 10:
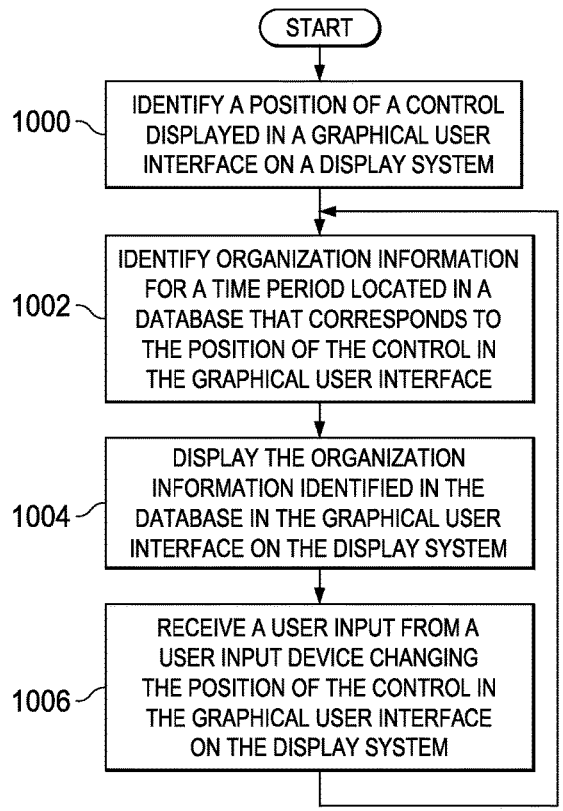
FIG. 10 is an illustration of a flowchart of a process for displaying organization information on a display system in accordance with an illustrative embodiment.

With reference now to FIG. 10, an illustration of a flowchart of a process for displaying organization information on a display system is depicted in accordance with an illustrative embodiment. The process illustrated in FIG. 10 may be implemented in organization information environment 100 in FIG. 1. In particular, the process may be implemented using viewer 110 to display organization information 104 in graphical user interface 113 on display system 118.

The process begins by identifying a position of a control displayed in a graphical user interface on a display system (operation 1000). In operation 1000, the position may be an initial position that is a default or preselected position. In other illustrative examples, the position may be selected by a user input.

The process identifies organization information for a time period located in a database that corresponds to the position of the control in the graphical user interface (operation 1002). The process then displays the organization information identified in the database in the graphical user interface on the display system (operation 1004). The graphical display of the organization information in graphical user interface on the display system enables presenting organization information for selected time periods.

The process receives a user input from a user input device changing the position of the control in the graphical user interface on the display system (operation 1006). The process returns to operation 1002 as described above to identify the organization information located in the database that corresponds to the position of the control as changed by the user input. The process may repeat any number of times as long as viewing of the organization information is desired in this illustrative example.

Figure 11:
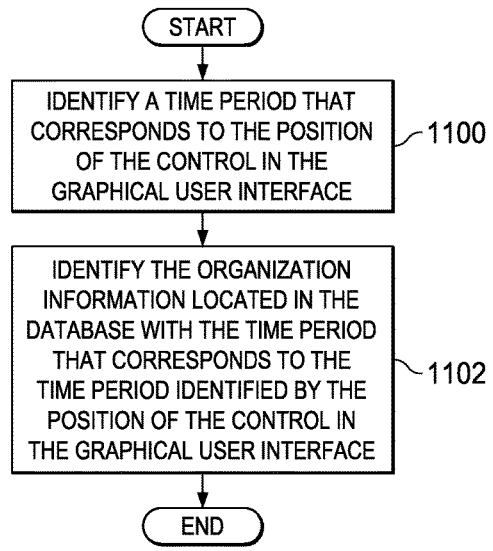
FIG. 11 is an illustration of a flowchart of a process for identifying organization information in accordance with an illustrative embodiment.

Turning next to FIG. 11, an illustration of a flowchart of a process for identifying organization information is depicted in accordance with an illustrative embodiment. The process illustrated in FIG. 11 is an example of one manner in which operation 1002 in FIG. 10 may be implemented.

The process begins by identifying a time period that corresponds to the position of the control in the graphical user interface (operation 1100). The time period may be a date or a range of dates depending on the particular implementation.

The process identifies the organization information located in the database with the time period that corresponds to the time period identified by the position of the control in the graphical user interface (operation 1102) with the process terminating thereafter. In operation 1102, the process may generate a query for the organization information using the time period identified.

Figure 12:
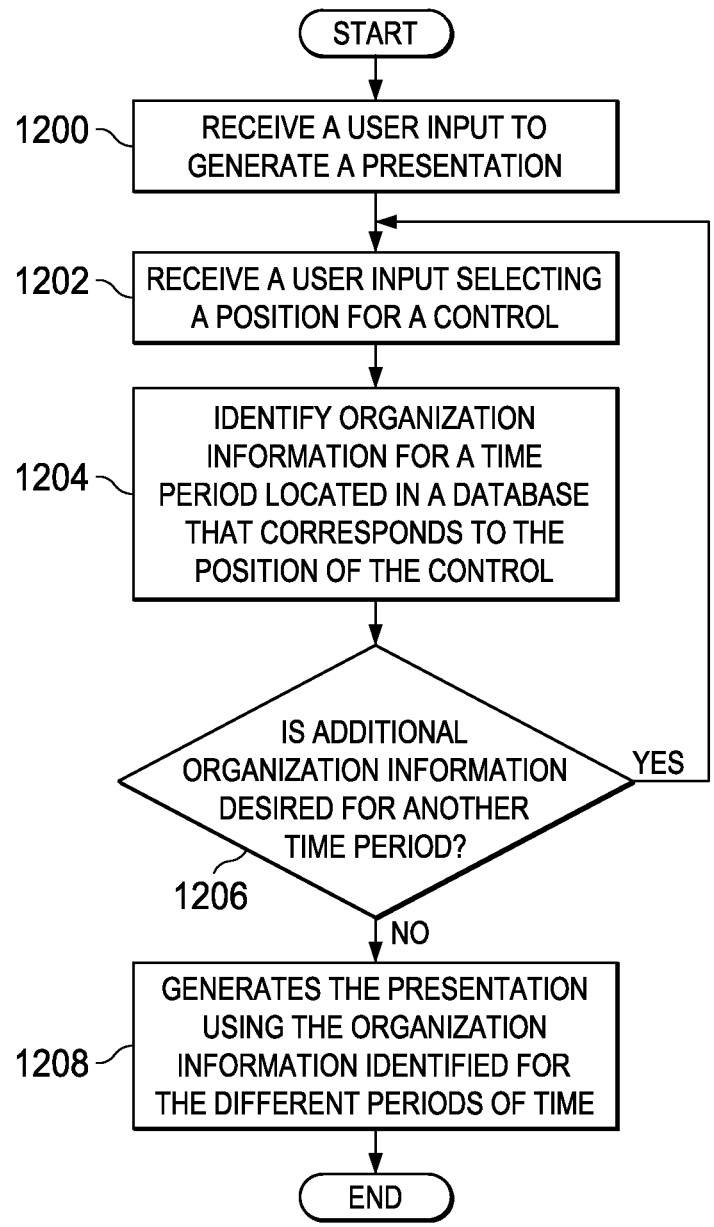
FIG. 12 is an illustration of a flowchart of a process for generating a presentation from organization information in accordance with an illustrative embodiment.

Turning now to FIG. 12, an illustration of a flowchart of a process for generating a presentation from organization information is depicted in accordance with an illustrative embodiment. The process in FIG. 12 may be implemented using viewer 110 in FIG. 1 to generate presentation 226 in FIG. 2.

The process begins by receiving a user input to generate a presentation (operation 1200). The process then receives a user input selecting a position for a control (operation 1202). The process identifies organization information for a time period located in a database that corresponds to the position of the control (operation 1204).

A determination is then made as to whether additional organization information is desired for another time period (operation 1206). The determination in operation 1206 may be made based on a user input indicating whether the presentation has been completed. If additional organization information is desired for another time period, the process returns to operation 1202.

Otherwise, the process generates the presentation using the organization information identified for the different periods of time (operation 1208) with the process terminating thereafter. The presentation may take various forms. For example, the presentation may be a slideshow, a video, a report, or some other suitable type of presentation that shows organization information for the different periods of time selected by user input moving the control to different positions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
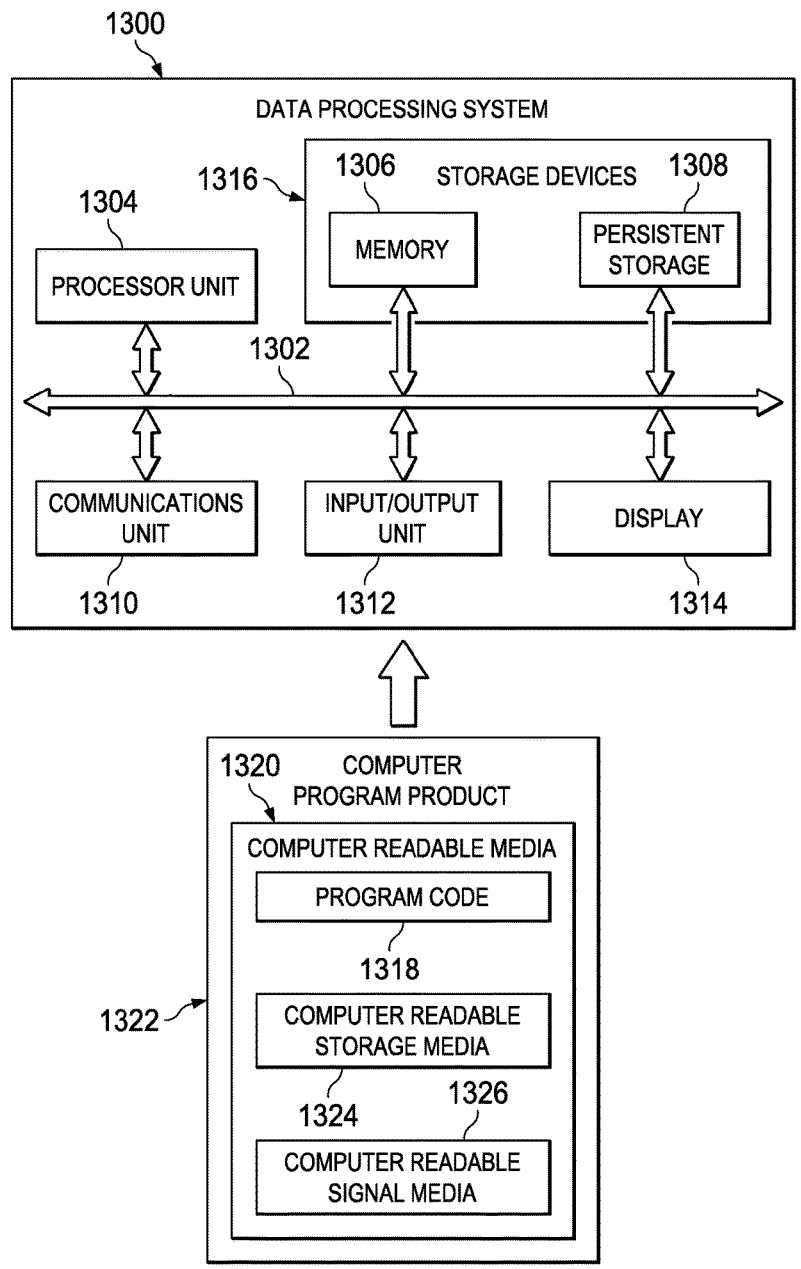
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 may be used to implement one or more data processing systems in computer system 114 in FIG. 1. In this illustrative example, data processing system 1300 includes communications framework 1302, which provides communications between processor unit 1304, memory 1306, persistent storage 1308, communications unit 1310, input/output (I/O) unit 1312, and display 1314. In this example, communication framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer readable storage devices in these illustrative examples. Memory 1306, in these examples, may be, for example, a random access memory (RAM) or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer usable program code, or computer readable program code that may be read and executed by a processor in processor unit 1304. The program code in the different embodiments may be embodied on different physical or computer readable storage media, such as memory 1306 or persistent storage 1308.

Program code 1318 is located in a functional form on computer readable media 1320 that is selectively removable and may be loaded onto or transferred to data processing system 1300 for execution by processor unit 1304. Program code 1318 and computer readable media 1320 form computer program product 1322 in these illustrative examples. In one example, computer readable media 1320 may be computer readable storage media 1324 or computer readable signal media 1326.

In these illustrative examples, computer readable storage media 1324 is a physical or tangible storage device used to store program code 1318 rather than a medium that propagates or transmits program code 1318.

Alternatively, program code 1318 may be transferred to data processing system 1300 using computer readable signal media 1326. Computer readable signal media 1326 may be, for example, a propagated data signal containing program code 1318. For example, computer readable signal media 1326 may be at least one of an electromagnetic signal, an optical signal, or any other suitable type of signal. These signals may be transmitted over at least one of a communications link such as a wireless communications link, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

Thus, the illustrative embodiments provide a method, apparatus, system, and computer program product for displaying organization information for different periods of time. A control is displayed in graphical user interface that is movable to different positions. The position of the control is used to identify what information to display for an object.

With the use of the control, identifying historical or older information about objects, such as employees, may be displayed more easily, with a better level of comprehension, or both as compared to currently used information systems for viewing organization information. In the different illustrative examples, a viewer changes a general purpose computer system into a special purpose computer system that allows for improved access to organization information. The viewer, in an illustrative example, includes a control that is movable to different positions. For example, each position is associated with a particular event, employee, or employees in an organization. The selection of a position results in information for that event being displayed. This event may be one that occurred at a prior time period or that may occur in a future time period.

Thus, the viewer in the illustrative examples enables presenting the organization information for selected time periods in graphical user interface. With the viewer enables an operator to perform tasks in an organization more efficiently in the illustrative examples. The tasks may include, for example, at least one of researching records, reviewing compensation, hiring new employees, performing retention activities, administering benefits, performing research, planning new products, planning expansions, or other suitable tasks with respect to an organization.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for displaying organization information on a display system, the method comprising:

identifying, by the computer system, record in the organization information for located in a database;

displaying, by the computer system, the record of the organization information identified in the database in a graphical user interface on the display system, wherein a graphical display of the organization information in the graphical user interface in the display system enables presenting the organization information for selected time periods;

displaying, by the computer system, a slider bar in the graphical user interface, wherein the slider bar represents a timeline of changes to a set of fields in the record, wherein the slider bar includes a series of markers indicating an effective date for changes to the set of fields in the record;

responsive to receiving user input from a user input device that changes a position of a slider control along the slider bar to select one of the markers, displaying, by the computer system, the effective date for the changes in the slider control;

displaying, by the computer system, the set of fields in the record as of the effective date indicated by the position of the slider control; and displaying, by the computer system, a set of graphical indicators in the graphical user interface, wherein the set of graphical indicators visually distinguish changes to the set of fields occurring on the effective date.

2. The method of claim 1 further comprising:
receiving, by the computer system, user input from a user input device changing the position of the control in the graphical user interface on the display system;
identifying, by the computer system, the organization information located in the database that corresponds to the position of the control as changed by the user input; and
displaying, by the computer system, the organization information identified in the database in the graphical user interface on the display system.

3. The method of claim 1, wherein the organization information is located in a record in the database for an object and wherein displaying, by the computer system, the organization information identified in the database in the graphical user interface on the display system comprises:
displaying the record in the graphical user interface.

4. The method of claim 3, wherein identifying, by the computer system, the organization information located in the database that corresponds to the position of the control in the graphical user interface comprises:
identifying, by the computer system, the organization information located in the database with a time period that corresponds to the position of the control in the graphical user interface.

5. The method of claim 1, wherein displaying, by the computer system, the organization information identified in the database in the graphical user interface on the display system comprises:
graphically displaying, by the computer system, the organization information identified in the database using nodes in the graphical user interface on the display system.

6. The method of claim 5 further comprising:
graphically displaying, by the computer system, links between the nodes to graphically indicate relationships between the nodes graphically displayed in the graphical user interface on the display system.

7. The method of claim 5 further comprising:
receiving, by the computer system, user input identifying a reference node in the nodes; and
wherein identifying, by the computer system, the organization information located in the database that corresponds to the position of the control in the graphical user interface comprises:
identifying, by the computer system, the organization information located in the database that corresponds to the position of the control in the graphical user interface using the reference node.

8. The method of claim 1 further comprising:
identifying, by the computer system, positions of the control selected by user input;
generating, by the computer system, a presentation from the organization information identified for each of the positions to form displays of the organization information; and
displaying, by the computer system, the presentation of the organization information on the display system.

9. The method of claim 1, wherein the organization information is selected from at least one of employee information, employee benefits, skills, performance evaluation, dependent information, human resource related information, research data, marketing data, business information, or financial information.

10. The method of claim 1, wherein the organization information is displayed as one of an organizational chart and an employee record.

11. A computer system comprising:
a display system; and
a viewer in the computer system in communication with the display system, wherein the viewer identifies a record in organization information located in a database; displays the record of the organization information identified in the database in a graphical user interface on the display system, wherein a graphical display of the organization information in the graphical user interface in the display system enables presenting the organization information for selected time periods; displays a slider bar in the graphical user interface, wherein the slider bar represents a timeline of changes to a set of fields in the record, wherein the slider bar includes a series of markers indicating an effective date for changes to the set of fields in the record; displays the effective date for the changes in the slider control in response to receiving user input from a user input device that changes a position of a slider control along the slider bar to select one of the markers; displays the set of fields in the record as of the effective date indicated by the position of the slider control; and displays a set of graphical indicators in the graphical user interface, wherein the set of graphical indicators visually distinguish changes to the set of fields occurring on the effective date.

12. The computer system of claim 11, wherein the viewer receives user input from a user input device changing the position of the control in the graphical user interface on the display system; identifies the organization information located in the database that corresponds to the position of the control as changed by the user input; and displays the organization information identified in the database in the graphical user interface on the display system.

13. The computer system of claim 11, wherein the organization information is located in a record in the database for an object and wherein in displaying the organization information identified in the database in the graphical user interface on the display system, the viewer displays the record in the graphical user interface.

14. The computer system of claim 13, wherein in identifying the organization information located in the database that corresponds to the position of the control in the graphical user interface, the viewer identifies the organization information located in the database with a time period identified by the position of the control in the graphical user interface.

15. The computer system of claim 11, wherein in displaying the organization information identified in the database in the graphical user interface on the display system, the viewer graphically displays the organization information identified in the database in nodes in the graphical user interface on the display system.

16. The computer system of claim 14, wherein the viewer graphically displays links between nodes to graphically indicate relationships between the nodes graphically displayed in the graphical user interface on the display system.

17. The computer system of claim 15, wherein the viewer receives user input identifying a reference node in the nodes; and
wherein in identifying the organization information located in the database that corresponds to the position of the control in the graphical user interface, the viewer identifies the organization information located in the database that corresponds to the position of the control in the graphical user interface using the reference node.

18. The computer system of claim 11, wherein the viewer identifies positions of the control selected by user input; generates a presentation from the organization information identified for each of the positions to form displays of the organization information; and displays the presentation of the organization information on the display system.

19. A computer program product for displaying organization information on a display system, the computer program product comprising:

a non-transitory computer readable storage media;

program code, stored on the non-transitory computer readable storage media, for identifying record in the organization information for a time period located in a database;

program code, stored on the non-transitory computer readable storage media, for displaying the record of the organization information identified in the database in a graphical user interface on the display system, wherein a graphical display of the organization information in the graphical user interface in the display system enables presenting the organization information for selected time periods;

program code, stored on the non-transitory computer readable storage media, for displaying a slider bar in the graphical user interface, wherein the slider bar represents a timeline of changes to a set of fields in the record, wherein the slider bar includes a series of markers indicating an effective date for changes to the set of fields in the record;

program code, stored on the non-transitory computer readable storage media, for displaying the effective date for the changes in the slider control responsive to receiving user input from a user input device that changes a position of a slider control along the slider bar to select one of the markers;

program code, stored on the non-transitory computer readable storage media, for displaying the set of fields in the record as of the effective date indicated by the position of the slider control; and program code, stored on the non-transitory computer readable storage media, for displaying a set of graphical indicators in the graphical user interface, wherein the set of graphical indicators visually distinguish changes to the set of fields occurring on the effective date.

20. The computer program product of claim 19 further comprising:

program code, stored on the non-transitory computer readable storage media, for identifying positions of the control selected by user input;

program code, stored on the non-transitory computer readable storage media, for generating a presentation from the organization information identified for each of the positions to form displays of the organization information; and program code, stored on the non-transitory computer readable storage media, for displaying the presentation of the organization information on the display system.

21. A computer system comprising:

a display system; and a viewer in the computer system in communication with the display system, wherein the viewer identifies a record in employee information located in a database; displays the record of the employee information identified in the database in a graphical user interface on the display system, wherein a graphical display of the employee information in the graphical user interface in the display system enables presenting the employee information for selected time periods; displays a slider bar in the graphical user interface, wherein the slider bar represents a timeline of changes to a set of fields in the record, wherein the slider bar includes a series of markers indicating an effective date for changes to the set of fields in the record; displays the effective date for the changes in the slider control in response to receiving user input from a user input device that changes a position of a slider control along the slider bar to select one of the markers; displays the set of fields in the record as of the effective date indicated by the position of the slider control; and displays a set of graphical indicators in the graphical user interface, wherein the set of graphical indicators visually distinguish changes to the set of fields occurring on the effective date.

* * * * *